(12) United States Patent
Sugawara

(10) Patent No.: US 8,497,952 B2
(45) Date of Patent: Jul. 30, 2013

(54) DISPLAY DEVICE

(75) Inventor: Hideaki Sugawara, Kawasaki (JP)

(73) Assignee: NLT Technologies, Ltd., Kanagawa (JP)

( * ) Notice: Subject to any disclaimer, the term of this patent is extended or adjusted under 35 U.S.C. 154(b) by 40 days.

(21) Appl. No.: 13/332,595

(22) Filed: Dec. 21, 2011

(65) Prior Publication Data

US 2012/0162568 A1 Jun. 28, 2012

(30) Foreign Application Priority Data

Dec. 22, 2010 (JP) ................................. 2010-286140

(51) Int. Cl.
*G02F 1/1333* (2006.01)
(52) U.S. Cl.
USPC .......................................................... 349/58
(58) Field of Classification Search
USPC .......................................................... 349/58
See application file for complete search history.

(56) References Cited

U.S. PATENT DOCUMENTS

| 7,852,424 B2* | 12/2010 | Sugawara | 349/58 |
| 2005/0062899 A1* | 3/2005 | Fukayama et al. | 349/58 |
| 2005/0117086 A1* | 6/2005 | Sugahara et al. | 349/58 |
| 2006/0139510 A1* | 6/2006 | Liao et al. | 349/58 |
| 2008/0225197 A1* | 9/2008 | Maruyama et al. | 349/58 |
| 2009/0190059 A1* | 7/2009 | Ra | 349/58 |
| 2009/0256988 A1* | 10/2009 | Kim et al. | 349/58 |
| 2010/0134721 A1* | 6/2010 | Kamada | 349/65 |
| 2010/0309405 A1* | 12/2010 | Tajiri | 349/60 |
| 2012/0120326 A1* | 5/2012 | Takata | 348/790 |
| 2012/0293718 A1* | 11/2012 | Yoshida | 348/725 |

FOREIGN PATENT DOCUMENTS

| JP | 2005-91971 A | 4/2005 |
| JP | 2008-286977 A | 11/2008 |

* cited by examiner

*Primary Examiner* — Timothy L Rude
(74) *Attorney, Agent, or Firm* — Sughrue Mion, PLLC

(57) ABSTRACT

The invention provides a display device in which a slope portion is provided in the chassis of the backside member to be nonparallel to the display face of the display panel, and a film member is fixed along the slope portion, and the end of the film member extends beyond the slope portion to be in contact with the display panel, whereby a substantially close contact is established between the chassis and the display panel, and hence the display device can provide excellent dust-proof protection and durability.

15 Claims, 12 Drawing Sheets

DISPLAY DEVICE

This application is based upon and claims the benefit of priority from Japanese Patent Application No. 2010-286140, filed on Dec. 22, 2010, the disclosure of which is incorporated herein in its entirety by reference.

BACKGROUND OF THE INVENTION

1. Field of the Invention

This invention relates to flat panel display (FPD) devices, including liquid-crystal display devices, organic EL display devices, and field emission display (FED) devices (hereafter, referred simply as display devices), and particularly relates to liquid-crystal display devices.

2. Related Art

A display device, in general, has a display panel, a front frame provided on the front side of the display panel, and a backside member provided on the back side of the display panel. The backside member includes a backside support frame for supporting the display panel from the back side. The display panel is held between the front frame and the backside support frame of the backside member.

The front frame, having a picture-frame shape, is arranged on the display face side of the display panel to cover the periphery of the display panel. On the other hand, the backside support frame constitutes a frame in the shape of a picture-frame for supporting the display panel. When the display device is a liquid-crystal display device, the backside member of the liquid-crystal panel constituting the display panel has, in addition to the backside support frame, a backlight unit for illuminating the display panel. The backside support frame is arranged so as to cover the periphery of the backlight unit.

Recent trend of multiple displays requires a display device to have a reduced frame region covering the periphery of the display panel. As a result, the region of the display panel covered with the front frame and the backside support frame has been reduced. A product having a reduced framing region has a problem that it is susceptible to entry of dust or other contaminants into a display area since the approach route is short enough for the dust or other contaminants entering from the vicinity of the frame region to reach the display area. Various approaches have been proposed to solve this problem.

For example, in order to provide dust-proof and light-leakage-proof effects to a liquid-crystal panel, Japanese Laid-Open Patent Publication No. 2008-286977 proposes a configuration in which a step portion is provided at the front end of a front frame so as to project out toward the liquid-crystal panel, and a film member is attached to the step portion to be in contact with the liquid-crystal panel. However, JP2008-286977A merely suggests to provide dust-proof and light-leakage-proof effects between the front frame and the liquid-crystal panel, but does not point out the necessity of improving means for providing the dust-proof between the liquid-crystal panel and the backside support frame.

On the other hand, Japanese Laid-Open Patent Publication No. 2005-91971 discloses a liquid-crystal display device in which a form-elastic body is sandwiched between a front frame and a display panel, or between the display panel and a molded member (intermediate frame) forming a part of a backside support frame. The term "form-elastic body" as used herein means an elastic body having a cross section of L-shape, U-shape, circular tubular shape, or Z-shape, which is able to act as a cushion between the display panel and the molded member. The arrangement of the form-elastic body makes it possible to prevent the entry of contaminants and to absorb any external shock even if the gap between the display panel and the molded member is enlarged by deformation or the like.

SUMMARY OF THE INVENTION

As described above, according to the configuration described in JP2005-91971A, the form-elastic body made of a rubber material is fixed to the molded member forming the backside support frame, while a space is provided between the fixed portion of the form-elastic body and the contact portion between the form-elastic body and the display panel of the form-elastic body. This configuration makes it possible to prevent contaminants from entering from between the display panel and the backside support frame.

When as described in JP 2005-91971A, a molded member is provided on the back side of a display panel as a part of a backside support frame, and a form-elastic body made of a rubber material, that is a different material from that of the molded member is fixed to the molded member, the form-elastic body made of a rubber material will lose elasticity due to aged deterioration in a low-temperature environment. If the form-elastic body has lost elasticity due to aged deterioration, the display panel is subject to more load, leading to deterioration of display quality. Further, if the form-elastic body has lost elasticity due to aged deterioration, the form-elastic body will lose followability to the behavior of the liquid-crystal panel under vibration or temperature changes, possibly leading to deterioration of the dust-proof performance.

On the other hand, when a display device including a form-elastic body is used in a high-temperature environment, not only the hardness or strength of the form-elastic body made of a rubber material will be reduced, but also the form-elastic body will undergo material deterioration until it suffers from permanent distortion as a result of having been exposed to the high-temperature environment for a long period of time. This will induce a problem of deterioration in dust-proof performance due to reduction of sealing effect of the form-elastic body or due to deterioration of followability of the form-elastic body to the behavior of the liquid-crystal panel under vibration or temperature changes.

Further, the form-elastic body used in JP 2005-91971A is an expensive rubber molded item, and special dies are required to form its characteristic shape, whereby the manufacturing cost is increased.

Still further, the form-elastic body, having a unique cross-sectional shape, cannot stably hold an adhesive material for fixing the form-elastic body to the molded member. As a result, the form-elastic body, which is unstably attached to the molded member, may be displaced or removed from the molded member due to vibration of the display device or temperature variation, and may become unable to fulfill its function. If the form-elastic body itself is dislocated toward the display area, it may cause a display failure.

Therefore, an exemplary object of this invention is solve the aforementioned problems by providing a display device capable of durably providing excellent dust-proof performance and display quality and yet at low cost.

Another exemplary object of this invention is to provide, at low cost, a display device which is capable of improving the dust-proof performance between a display panel and a chassis disposed on the back side and included in a backside member, and yet has a long life.

An exemplary aspect of this invention provides a display device including: a display panel; and a backside member arranged on the back side of a display face of the display panel, wherein the backside member has, on the side facing the display face, a chassis having a slope portion which is in a positional relationship nonparallel to the display face of the display panel, and a film member disposed between the display panel and the chassis, and the film member has a fixed portion fixed at least partially to the slope portion of the chassis and an end provided at a position spaced from the fixed portion and being in contact with the display panel.

Another exemplary aspect of this invention provides a display device in which a chassis having a slope portion and a step portion provided adjacent to the slope portion is provided, so that film member is fixed to the slope portion by using the step portion as the reference mark.

Another exemplary aspect of this invention provides a display device in which a film member is arranged to extend from the slope portion to the side face of the chassis.

The aforementioned chassis having the slope portion and/or the step portion can be produced by integral molding. The film member may be an elastic film member with a thickness of 10 μm to 200 μm, made of a polymeric material such as PET or PC, or of a thin-film material such as an electrically conductive sheet or a graphite sheet having high thermal conductivity.

According to this invention, a configuration is employed in which the end of the film member fixed to the slope portion integrally formed with the chassis extends toward the display panel along an angle formed by the slope portion, and the end of the film member is in contact with the display panel so that the gap between the display panel and the backlight unit is filled with the film member. This enables the film member to constantly keep its followability to the behavior of the display panel under vibration or temperature variation, and thus a display device can be obtained which is capable of durably providing excellent dust-proof protection and display quality. Further, according to this invention, the slope portion to which the film member is fixed is integrally formed with the chassis, eliminating the need of bending or forming the film member itself. Accordingly, a low-cost display device can be realized.

DESCRIPTION OF EXEMPLARY EMBODIMENTS

Referring to the accompanying drawing, first to third exemplary embodiments of this invention will be described.

First Embodiment

Figure 1:
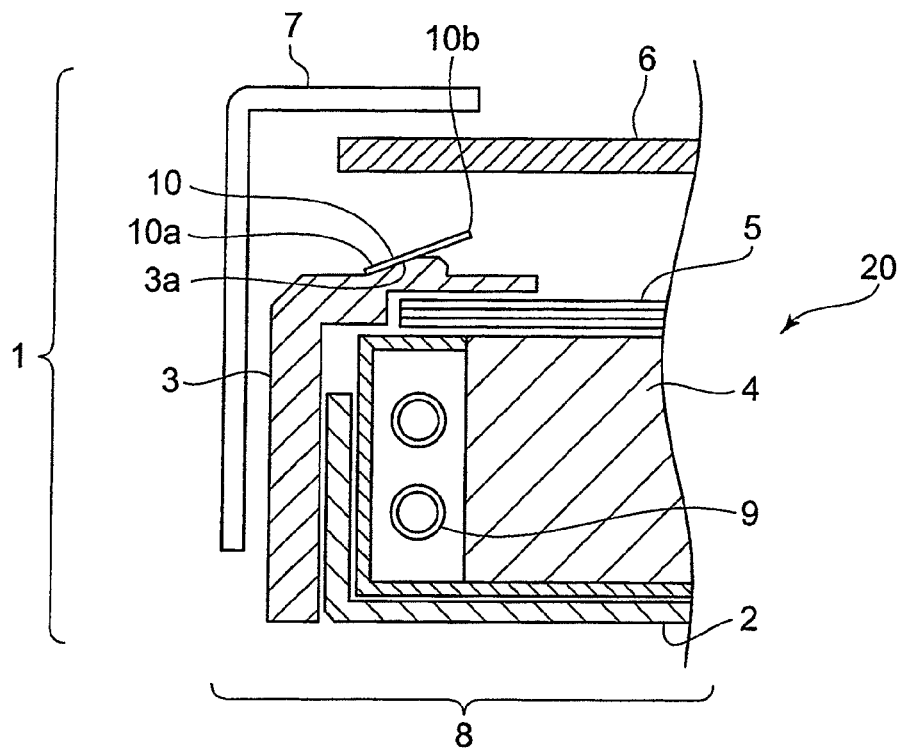
FIG. 1 is a partial cross-sectional view illustrating a display device according to a first embodiment of the invention in an exploded state.

FIG. 1 is a partial exploded cross-sectional view of a display device illustrating a configuration according to a first embodiment of the invention. A liquid-crystal display device 1 is shown here as a specific example of the display device. The shown liquid-crystal display device 1 has a display panel (a liquid crystal display panel in this example) 6, a front frame 7 provided on the front side, that is, on the display face side of the display panel 6, and a backside member 20 disposed on the rear face of the display panel 6.

The backside member 20 has a backlight unit 8 for illuminating the liquid crystal display panel forming the display panel 6 from the back side thereof. The shown backlight unit 8 includes a rear frame 2, a light guide plate 4, an optical sheet 5, and a light source 9. The light guide plate 4 is disposed under the optical sheet 5 to define a lamp house of the light source 9. The light guide plate 4 has a bottom face and a side face covered with a reflection sheet.

The backside member 20 further has a chassis 3 provided between the display panel 6 and the optical sheet 5. The chassis 3 forms a part of the backside support frame, and is arranged to partially cover the periphery of the optical sheet 5. Thus, the chassis 3 forms a framework which partially covers the surface of the backlight unit 8, and is disposed between the front frame 7 and the rear frame 2. Therefore, the chassis 3 can also be referred to as intermediate frame.

The chassis 3 has a top portion facing the display panel 6, and a side portion connected with the top portion and extending perpendicularly to the display panel 6 along the side face of the light guide plate 4. The shown chassis 3 further has, on the top portion, a planar region extending in parallel with the display face of the display panel 6, and a slope portion 3a projecting from the planar region toward the display panel 6 so as to assume a positional relationship nonparallel to the display face of the display panel 6. Further, the shown slope portion 3a has a slope inclined from the outer side to the inner side of the display panel 6. The chassis 3 having the slope portion 3a is formed of the same material as that of the other portions including the side portion but excluding the slope portion 3a, and therefore can be fabricated easily by integral molding.

Further referring to FIG. 1, a film member 10 is fixed to the slope portion 3a which is in a positional relationship nonparallel to the display face of the display panel 6. The shown film member 10 has a fixed portion 10a fixed to the slope portion 3a, and an end (a distal end) 10b extending from the fixed portion 10a to be located in the inner side below the display face of the display panel 6. The end 10b is arranged to extend beyond the slope portion 3a and to face the display panel 6.

Figure 2:
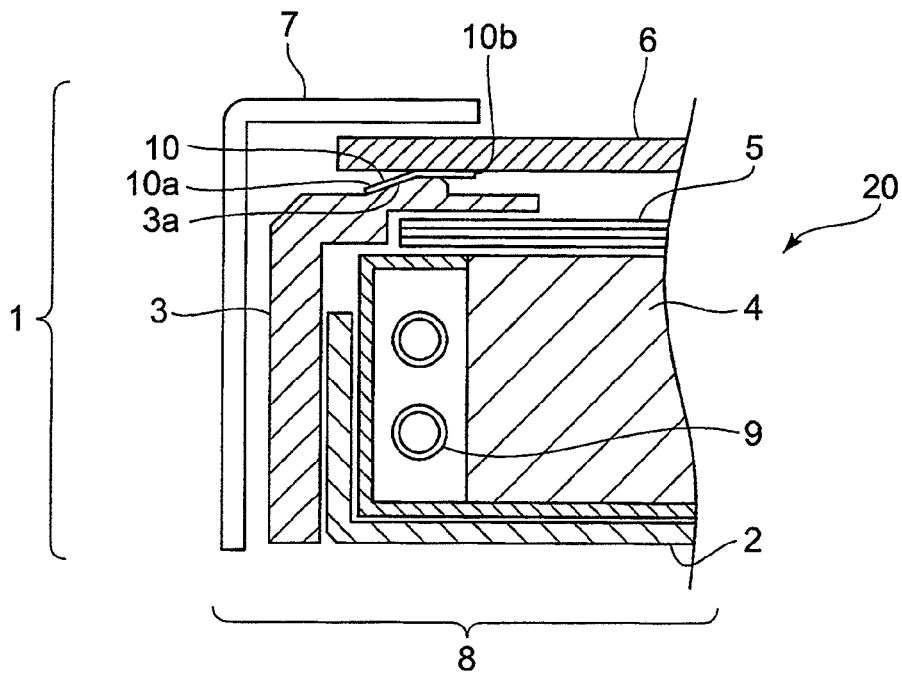
FIG. 2 is a partial cross-sectional view illustrating a state in which components have been assembled in the display device shown in FIG. 1.

FIG. 2 shows a state in which the display panel 6 and the chassis 3 of the display device 1 shown in FIG. 1 are assembled together with the use of the film member 10. As is obvious from FIG. 2, the end 10b of the film member 10 fixed to the slope portion 3a is in contact with the rear face of the display panel 6, and the space between the backlight unit 8 and the display panel 6 is filled with the film member 10.

The film member 10 thus establishes a substantially close contact between the backlight unit 8 and the display panel 6, and the space between the backlight unit 8 and the display panel 6 is filled with the film member 10. This makes it possible to keep them connected to each other with high dust-proof performance and high durability.

The film member 10 shown in FIG. 1 and FIG. 2 has flexibility and is made of a thin film material such as PET (Poly-Ethylene Terephthalate) or PC (Poly-Carbonate) having a thickness of 10 μm to 200 μm.

The display device according to the first embodiment as described above has the film member 10 made of a flexible thin film material and disposed between the chassis 3 and the display panel 6. Therefore, not only the dust-proof effect can be kept between the chassis 3 and the back side of the display panel 6, but also followability can be achieved to the behavior of the display panel 6 under vibration or temperature variation.

Figure 3:
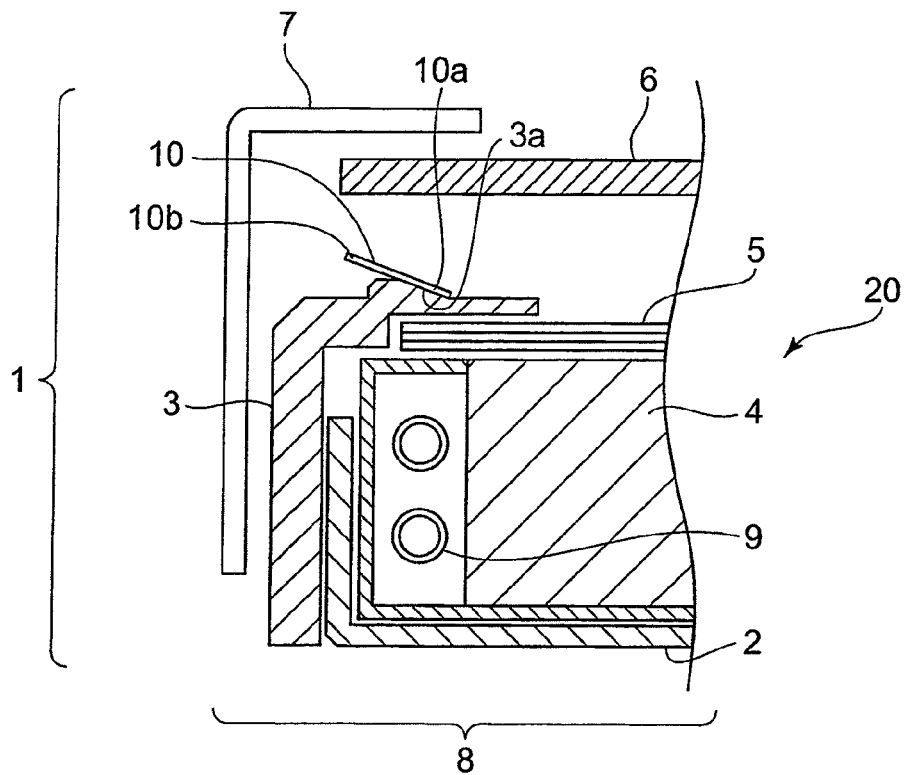
FIG. 3 is a partial cross-sectional view illustrating a display device according to a modification of the first embodiment of the invention in an exploded state.

FIG. 3 is a partial exploded cross-sectional view of a display device 1 according to a modification of the first embodiment of this invention. Whereas the angle that the slope portion 3a of the display device 1 shown in FIG. 1 and FIG. 2 forms with the display panel 6 is an acute angle, the angle that the slope portion 3a of the display device 1 shown in FIG. 3 forms with the display panel 6 is an obtuse angle. The film member 10 is fixed to the slope portion 3a, and the end 10b of the film member 10 extends toward the display panel 6 beyond the slope portion 3a.

In other words, the slope portion 3a of the chassis 3 shown in FIG. 3 is inclined from the outer side to the inner side of the display panel 6, and the end 10b of the film member 10 extends to the outer periphery of the display panel 6.

Figure 4:
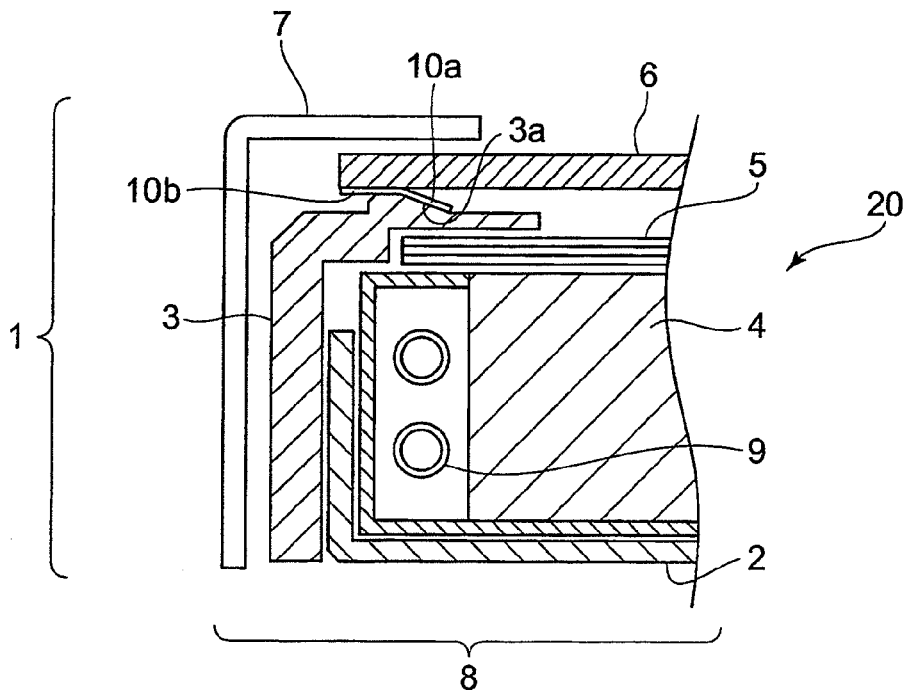
FIG. 4 is a partial cross-sectional view illustrating a state in which components have been assembled in the display device shown in FIG. 3.

FIG. 4 illustrates a state in which the display panel 6 and the front frame 7 of the display device 1 shown in FIG. 3 are assembled together with a backlight unit 8. The end 10b of the film member 10 fixed to the slope portion 3a of the chassis 3 is in contact with the outer periphery of the display panel 6. In this configuration as well, the space between the chassis 3 and the display panel 6 is filled with the film member 10, whereby the dust-proof protection can be ensured between the chassis 3 and the display panel 6. If the film member 10 used here is also made of a flexible thin film material like the one shown in FIGS. 1 and 2, the followability can be achieved to the behavior of the display panel 6 under vibration or temperature variation.

As is obvious from FIGS. 1 to 4, the slope portion 3a of the chassis 3 may be inclined either inward or outward of the display panel 6. Therefore, all the embodiments of this invention are commonly characterized by the positional relationship in which the slope portion 3a of the chassis 3 assumes a positional relationship nonparallel to the display panel 6. Description will be made of features common to all the embodiments of the invention.

Figure 5:
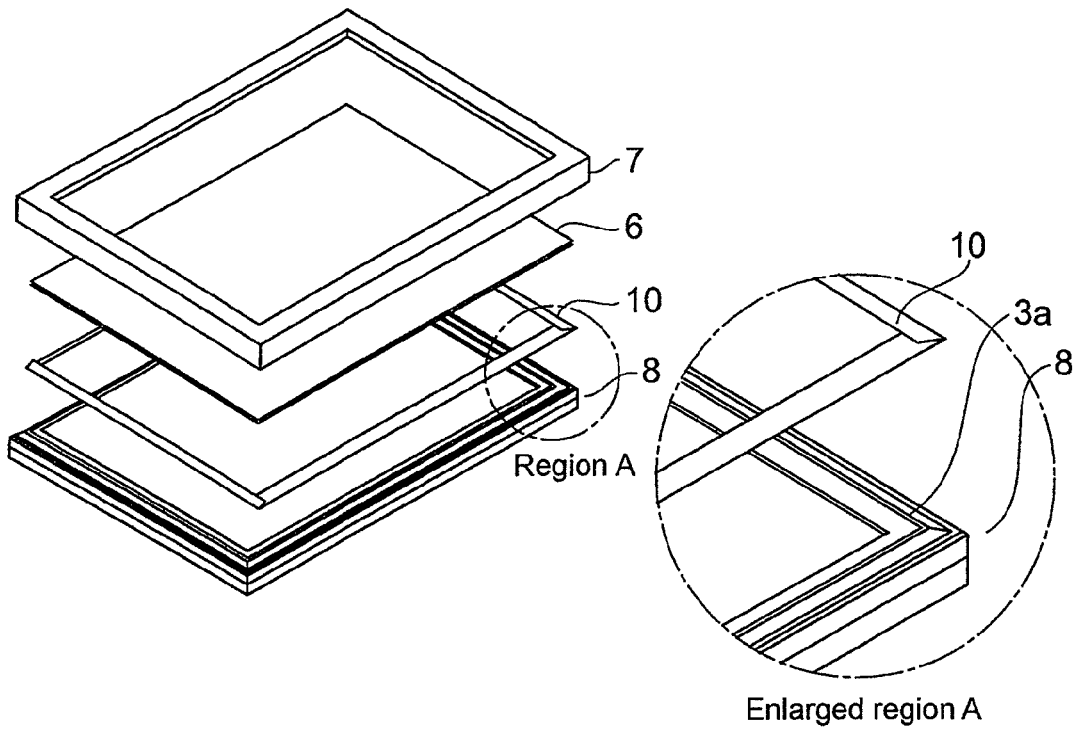
FIG. 5 is an exploded perspective view illustrating a configuration of the display device according to this invention and an enlarged view illustrating a part thereof.

FIG. 5 is an exploded perspective view illustrating features of the display device 1 which are common to all the embodiments of this invention. There are shown, in FIG. 5, a backlight unit 8, a film member 10, a display panel 6, and a front frame 7. A part of FIG. 5, namely a region A is shown in an enlarged view on the left side of FIG. 5. In the region A shown in the enlarged view of FIG. 5, the slope portion 3a is formed along the entire periphery of the display panel 6.

The film member 10 fixed to the slope portion 3a may be provided at an arbitrary position on at least one side of a quadrangle corresponding to the periphery of the display panel 6. Alternatively, the film member 10 may be arranged in plurality to extend along the entire periphery of the display panel 6 like in the display device 1 shown in FIG. 5. The ends of the film members 10 may be overlapped with each other.

Figure 6:
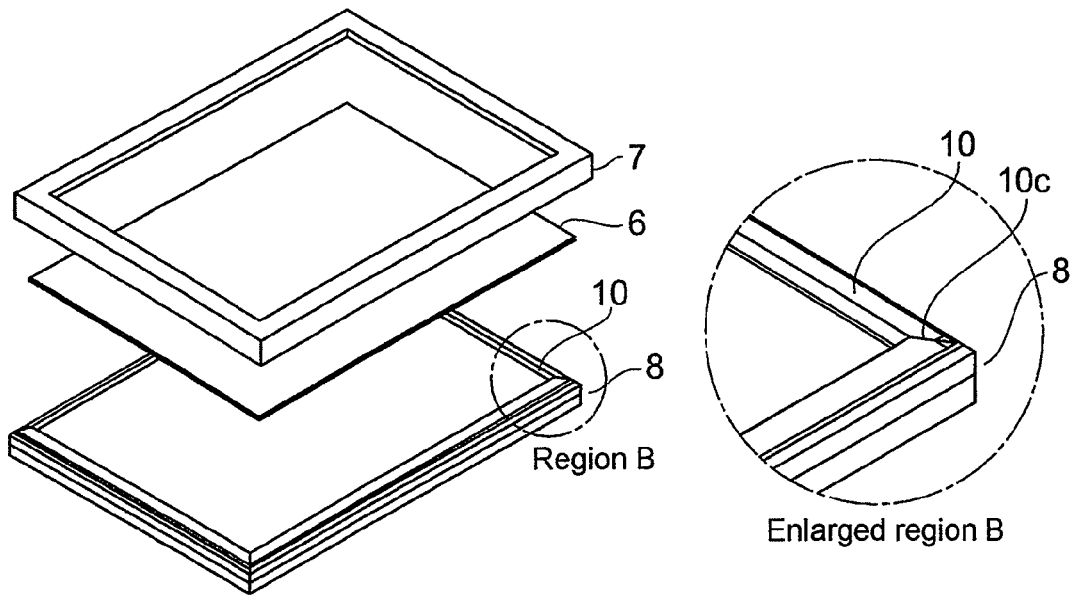
FIG. 6 is an exploded perspective view illustrating another configuration of the display device according to this invention and an enlarged view illustrating a part thereof.
Figure 7:
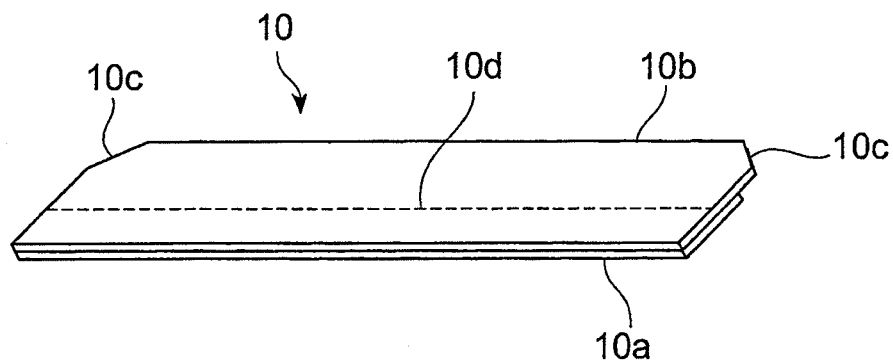
FIG. 7 is a perspective view for specifically explaining a film member used in this invention.

Further, as shown in FIG. 6, a notch 10c may be formed at each end of each of the film members 10 so that the ends of the film members do not overlap with each other. FIG. 7 shows a specific example of a configuration of the film member 10 shown in FIG. 6. The film member 10 shown in FIG. 7 has a configuration in which a sheet member is mounted on the fixed portion 10a, and the end 10b of the sheet member can be arranged to extend beyond the slope portion 3a of the chassis 3 to be in contact with the display panel 6. Further, the film member 10 shown in FIG. 7 is provided with a slit portion 10d formed by punching or perforation.

When this type of film member 10 is used, for example, the film member 10 may be fixed to a part of the chassis 3 other than the slope portion 3a easily by bending the film member 10 along the slit portion aligned with the boundary between the slope portion 3a and the other surface of the chassis 3.

Figure 8:
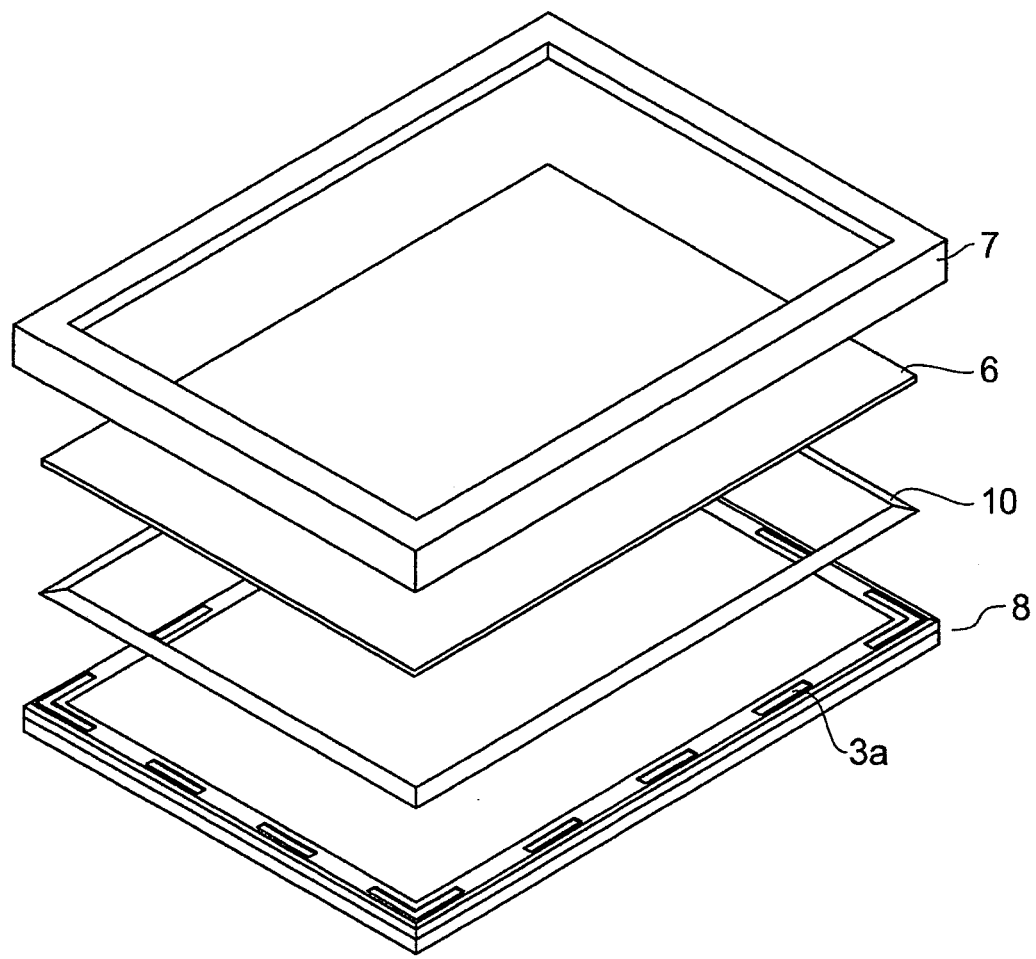
FIG. 8 is an exploded perspective view illustrating another configuration example of the display device according to this invention.

FIG. 8 shows a slope portion 3a according to another modification of this invention. The slope portion 3a shown in FIG. 8 is composed of a plurality of slope subportions formed by dividing the slope portion 3a in an axial direction of each side of the backlight unit 8. The slope subportions are arranged at intervals on each side of the backlight unit 8. The slope portion 3a according to this modification also has a step portion as described below.

Figure 9:
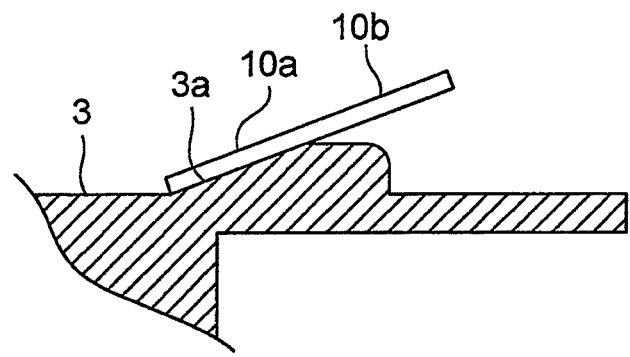
FIG. 9 is a cross-sectional view illustrating an example of a slope portion according to the first embodiment of the invention.
Figure 11:
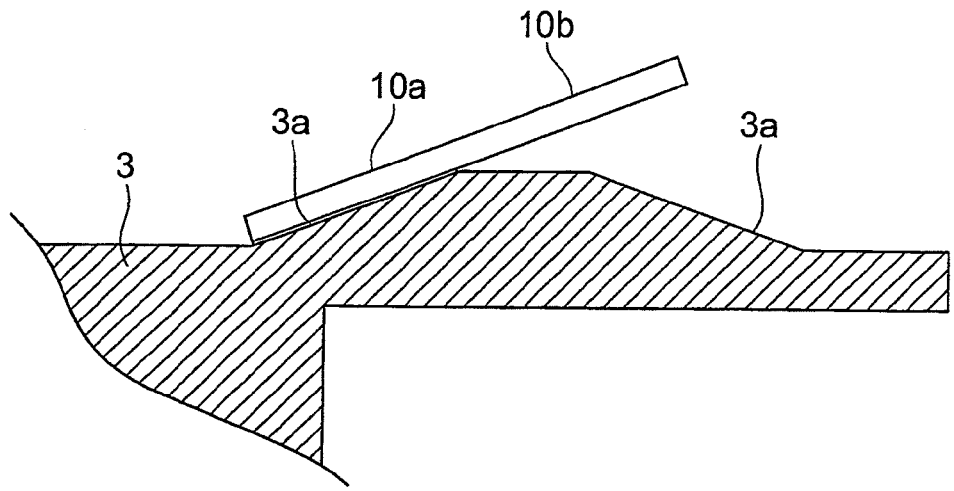
FIG. 11 is a cross-sectional view illustrating another configuration example of the slope portion according to the first embodiment of the invention.
Figure 12:
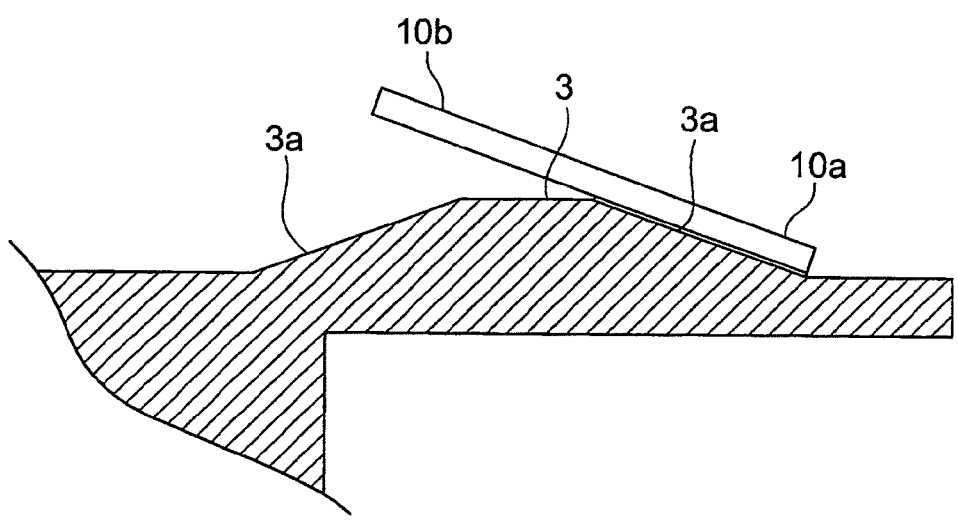
FIG. 12 is a cross-sectional view illustrating still another configuration example of the slope portion according to the first embodiment of the invention.

FIG. 9 is an enlarged cross-sectional view illustrating the slope portion 3a of the display device 1 which is common to all the embodiments of this invention. The slope portion 3a of the chassis 3 shown in FIG. 9 has an inclined portion inclined relative to the planar region of the chassis 3, and a flat portion which is continuous with the inclined portion. The portion opposite to the inclined portion across the flat portion is a side wall standing vertically to the planar region. However, this embodiment is not limited to this configuration of the slope portion 3a. As shown in FIG. 11 and FIG. 12, the portion opposite to the inclined portion across the flat portion may be another slope portion 3a that is inclined to the planar region of the chassis 3. Specifically, in the examples shown in FIGS. 11 and 12, the chassis 3 has two slope portions 3a which are in a positional relationship nonparallel to the display face of the display panel 6, and a flat portion is located between these slope portions 3a. Further, two or more slope portions 3a may be formed in the chassis 3. The provision of a plurality of slope portions 3a enhances the dust-proof performance.

As shown in FIG. 9, the fixed portion 10a of the film member 10 is fixed to the inclined portion of the slope portion 3a of the chassis 3, and the end 10b of the film member 10 extends out beyond the slope portion 3a.

Referring to FIG. 11, the fixed portion 10a of the film member 10 is fixed to the inclined portion of the slope portion 3a of the chassis 3, and the end 10b of the film member 10 extends out beyond the slope portion 3a to above the other slope portion 3a.

FIG. 12 illustrates another configuration example, in which the fixed portion 10a of the film member 10 is fixed to the other slope portion 3a (on the right side as viewed in FIG. 12) situated on the opposite side from the slope portion 3a to which the fixed portion 10a of the film member 10 is fixed in FIG. 11. The end 10b of the film member 10 extends to above the left-side slope portion 3a or beyond the left-side slope portion 3a, toward the front frame 7.

Figure 10:
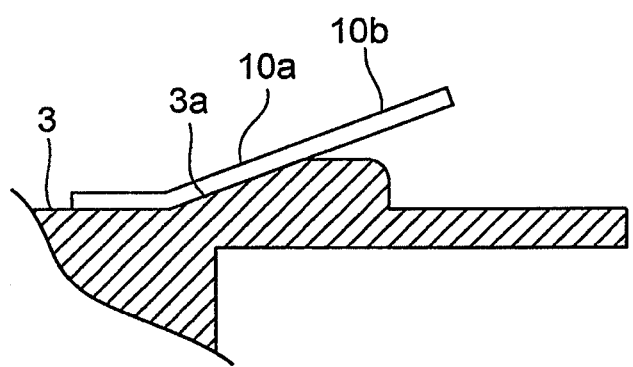
FIG. 10 is a cross-sectional view illustrating another configuration example of the slope portion according to the first embodiment of the invention.

Referring to FIG. 10, the left end of fixed portion 10a of the film member 10 extends beyond the inclined portion of the slope portion 3a and reaches the planar region of the chassis 3. This means that the fixed portion 10a of the film member 10 need not be situated entirely within the slope portion 3a, but can be extended beyond the slope portion 3a. Likewise, in the examples shown in FIG. 11 and FIG. 12 as well, the fixed portion 10a of the film member 10 need not be situated entirely within the slope portion 3a, but may be extended beyond the slope portion 3a toward the planar region.

Figure 13:
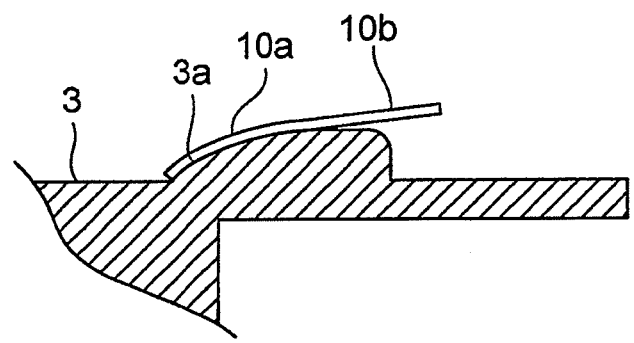
FIG. 13 is a cross-sectional view illustrating still another configuration example of the slope portion according to the first embodiment of the invention.

FIG. 13 illustrates another example of the slope portion 3a formed in the chassis 3. As shown in FIG. 13, the cross-sectional shape of the inclined portion of the slope portion 3a is not limited to a linear shape but may be a shape having a curvature radius, that is, a curved shape.

Figure 14:
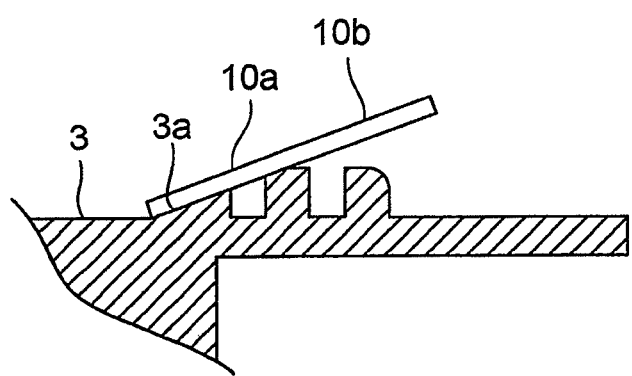
FIG. 14 is a cross-sectional view illustrating a modification of the slope portion according to the first embodiment of the invention.

Further, as shown in FIG. 14, the slope portion 3a of the chassis 3 may have a concavo-convex shape. Specifically, the cross-sectional shape of the slope portion 3a may be formed of a combination of a plurality of projections, as long as the fixed portion 10a of the film member 10 fixed to the slope portion 3a is in a positional relationship nonparallel to the display face of the display panel 6. In other words, the projections in the slope portion 3a may be arranged such that the fixed portion 10a of the film member 10 assumes a positional relationship nonparallel to the display face of the display panel 6.

The first embodiment of this invention described so far relates to a configuration in which the end 10b of the film member 10 fixed to the slope portion 3a extends toward the display panel 6 along an angle formed by the slope portion 3a, and the end 10b of the film member 10 is in contact with the display panel 6 so that the gap between the display panel 6 and the backlight unit 8 is filled with the end 10b of the film member 10. This enables the film member 10 to constantly maintain its followability to the behavior of the display panel 6 under vibration or temperature variation, and thus a display device can be realized which is capable of durably providing excellent dust-proof performance and excellent display quality. Further, the slope portion 3a for fixing the film member 10 can be molded integrally with the chassis 3, and thus the film member itself need not be bent or formed. This makes it possible to provide a low-cost display device.

Second Embodiment

A display device according to a second embodiment of this invention will be described with reference to FIGS. 15, 16, and 17.

Figure 15:
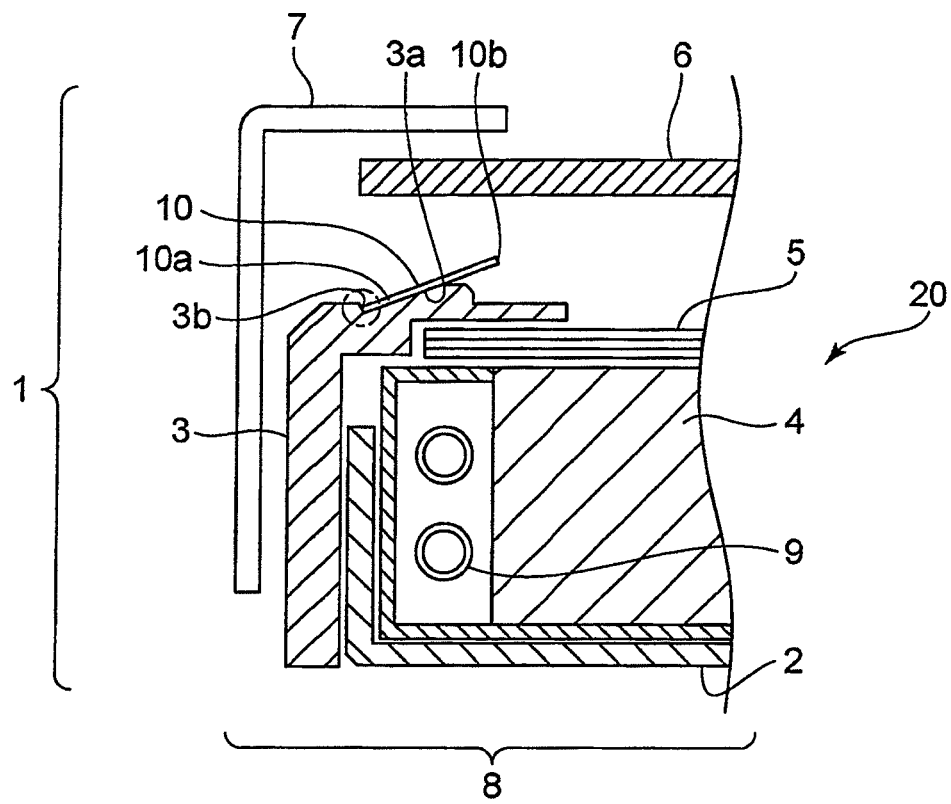
FIG. 15 is an exploded cross-sectional view illustrating a display device according to a second embodiment of this invention.

FIG. 15 is a partial exploded cross-sectional view illustrating a display device according to the second embodiment of this invention. Like in the first embodiment, FIG. 15 illustrates a liquid-crystal display device 1. The liquid-crystal display device 1 shown in FIG. 15 is different from the one according to the first embodiment in that it includes a chassis 3 provided with a step portion 3b in addition to a slope portion 3a. Specifically, the step portion 3b is formed by a groove between an inclined portion of the slope portion 3a and a planar region of the chassis 3. According to this configuration, one end of the film member 10 can be placed in contact with the step portion 3b.

The chassis 3 having the step portion 3b and the slope portion 3a can also be produced easily by integral molding.

Figure 16:
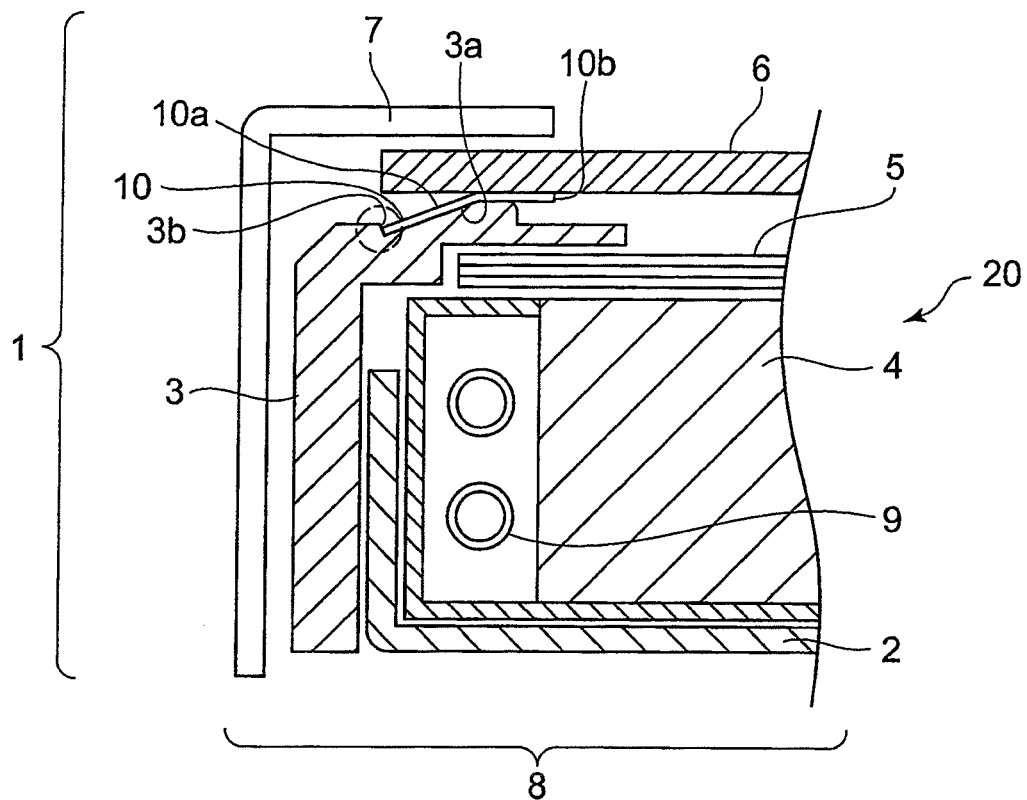
FIG. 16 is a partial cross-sectional view illustrating a state in which the components of the display device shown in FIG. 15 have been assembled.

FIG. 16 shows a state in which the display panel 6 and the chassis 3 shown in FIG. 15 are integrated by means of the film member 10. As shown in FIG. 16, the end 10b of the film member 10 fixed to the slope portion 3a and the step portion 3b is in contact with the display panel 6, so that the space between the backlight unit 8 and the display panel 6 is filled with the film member 10.

Figure 17:
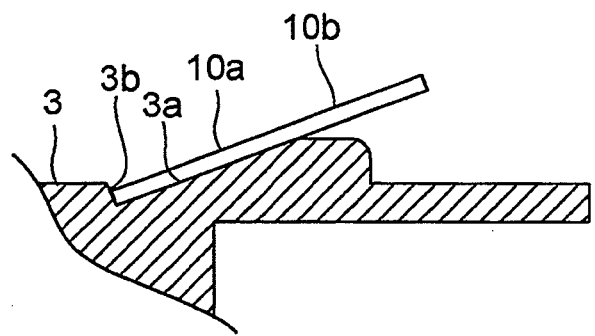
FIG. 17 is an enlarged partial cross-sectional view illustrating a part of the display device shown in FIG. 15.

FIG. 17 is a diagram illustrating a part of the chassis 3 of the display device 1 shown in FIGS. 15 and 16 in an enlarged scale. In the embodiment shown in FIG. 17, the film member 10 is fixed to the slope portion 3a along the step portion 3b so as to be in contact also with the step portion 3b which is formed integrally with the chassis 3 forming the framework on the surface of a backlight unit 8. The end 10b of the film member 10 that is at a position spaced from the fixed portion 10a extends toward the display panel 6 beyond the slope portion 3a of the film member 10.

Figure 18:
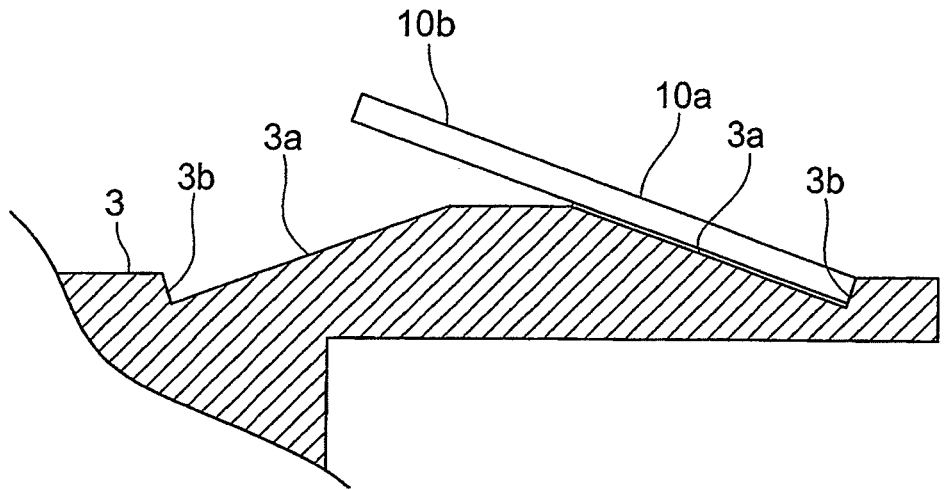
FIG. 18 is a partial cross-sectional view illustrating another configuration example of a slope portion according to the second embodiment the invention.

FIG. 18 illustrates another configuration example of the chassis 3 having the step portion 3b and the slope portion 3a according to this second embodiment. As shown in FIG. 18, the chassis 3 has a plurality of slope portions 3a, a flat portion between these slope portions 3a, and a step portion 3b formed by a groove between each of the slope portions 3a and each of the planar regions of the chassis 3. This configuration also provides a dust-proof effect similar to that of the configuration shown in FIG. 17.

According to the configuration of the second embodiment, like the configuration of the first embodiment, the end 10b of the film member 10 is in contact with the display panel 6 in the state in which the display panel 6 and the front frame 7 are assembled together with the backlight unit 8, whereby the space between the backlight unit 8 and the display panel 6 can be filled with the film member 10.

Figure 19:
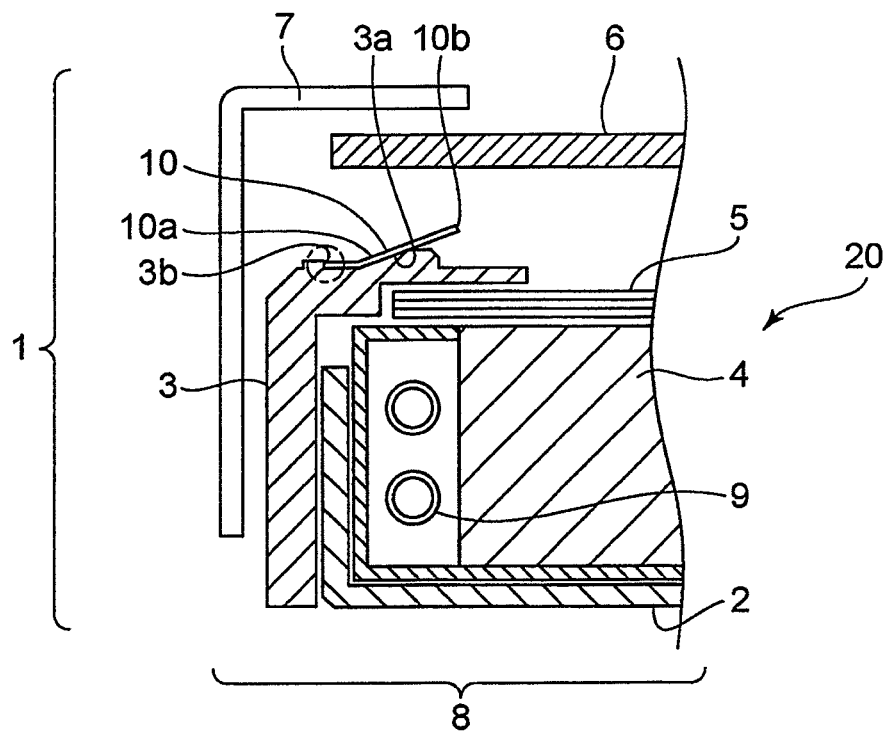
FIG. 19 is an exploded cross-sectional view illustrating another configuration example of the display device according to the second embodiment of the invention.
Figure 20:
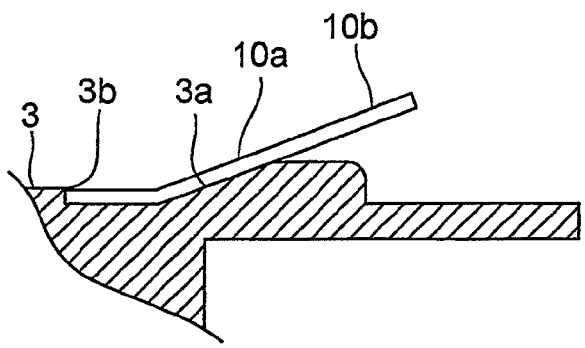
FIG. 20 is an enlarged partial cross-sectional view illustrating a part of the display device shown in FIG. 19.

FIG. 19 is an exploded cross-sectional view of a liquid-crystal display device 1 illustrating another modification of the second embodiment of this invention. FIG. 20 is an enlarged cross-sectional view illustrating the slope portion 3a and the step portion 3b of the display device 1 according to the second embodiment of the invention shown in FIG. 19.

The liquid-crystal display device 1 shown in FIGS. 19 and 20 has a chassis 3 having a configuration in which a groove is formed to be continuous with the inclined portion of the slope portion 3a and a convex step portion 3b is provided at the terminal end of the groove. The chassis 3 having such configuration also can be produced relatively easily by integral molding.

Figure 21:
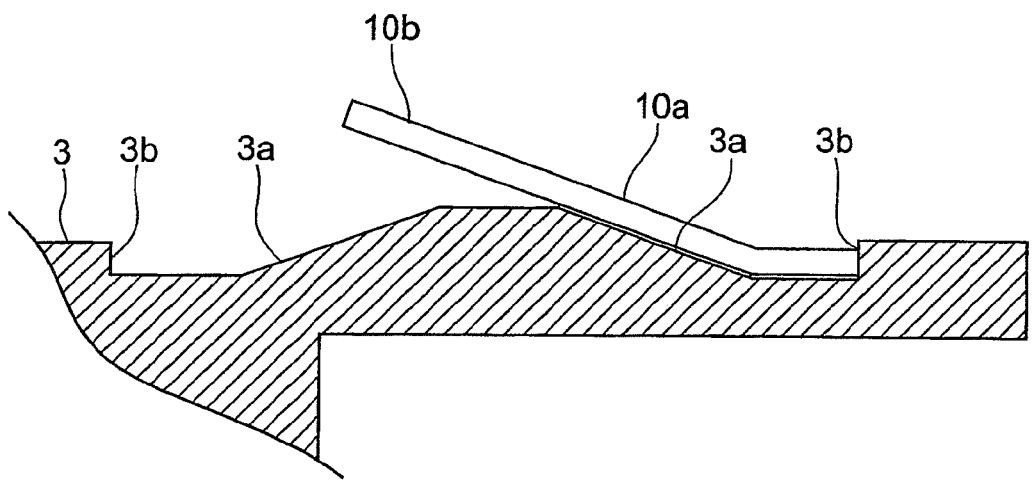
FIG. 21 is a partial cross-sectional view illustrating another configuration example of the slope portion according to the second embodiment of the invention.

As shown in FIGS. 19 and 20, the film member 10 is in contact with the convex step portion 3b integrally formed with the chassis 3, and also in contact with and fixed to the slope portion 3a and the flat portion that is continuous from the step portion 3b to the slope portion 3a of the chassis 3. The end 10b of the film member 10 that is at a position spaced from the fixed portion 10a of the film member 10 extends toward the display panel 6 beyond the slope portion 3a of the chassis 3. Alternatively, as shown in FIG. 21 illustrating another configuration example, a plurality of step portions 3b and slope portions 3a may be formed, and the film member 10 may be fixed to the slope portion 3a located on the opposite side from the slope portion 3a to which the film member 10 is fixed in FIG. 20.

According to this configuration, like the configuration of the first embodiment, the end 10b of the film member 10 is in contact with the display panel 6 in the state in which the display panel 6 and the front frame 7 are assembled together with the backlight unit 8, whereby the space between the backlight unit 8 and the display panel 6 can be filled with the film member 10. Thus, the second embodiment is able to provide the same effects as those of the first embodiment. Furthermore, the film member 10 can be positioned more easily since the film member 10 can be fixed in the state in which it is in contact with the step portion 3b.

Figure 22:
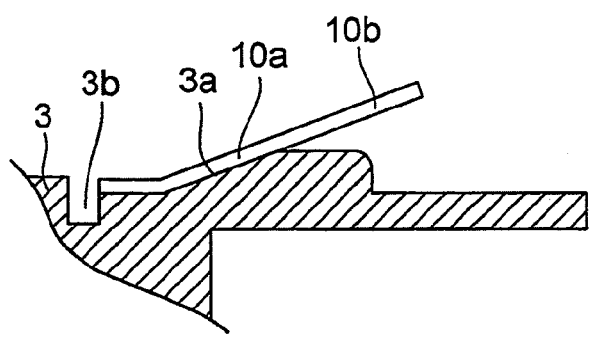
FIG. 22 is a partial cross-sectional view illustrating a modification of the display device according to the second embodiment of the invention.

FIG. 22 illustrates a modification of the step portion 3b. As shown in FIG. 22, the step portion 3b may be situated at a position spaced from the slope portion 3a, and the fixed portion 10a of the film member 10 may be fixed such that it extends beyond the slope portion 3a to reach the step portion 3b.

Further, the cross-sectional shape of the step portion 3b is not limited to the convex shape shown in FIG. 20, but it may be a concave shape as the step portion 3b shown in FIG. 22.

This means that the step portion 3b in the second embodiment of the invention may be of any shape as long as it serves as a reference mark indicating the position at which the fixed portion 10a of the film member 10 is fixed. Namely, the shape may be convex or concave, or an irregular shape other than rectangular or square.

In addition to the advantageous effects given by the first embodiment of the invention, the configuration of the second embodiment of this invention provides advantages that the position to fix the film member 10 is clearly indicated by the step portion 3b, which improves the efficiency of fixing the film member 10. Further, since the position to fix the film member 10 can be made constant, it is made possible to stabilize the load applied when the end 10b of the film member 10 becomes in contact with the display panel 6, and to stabilize the width where the end 10b is in contact with the display panel 6. As a result, even if the film member 10 is fixed to the entire periphery of the display area, stable dust-proof performance and high display quality can be ensured in the entire periphery of the display area. Thus, display devices with high quality can be realized without causing variations in dust-proof performance and display quality.

Third Embodiment

Figure 23:
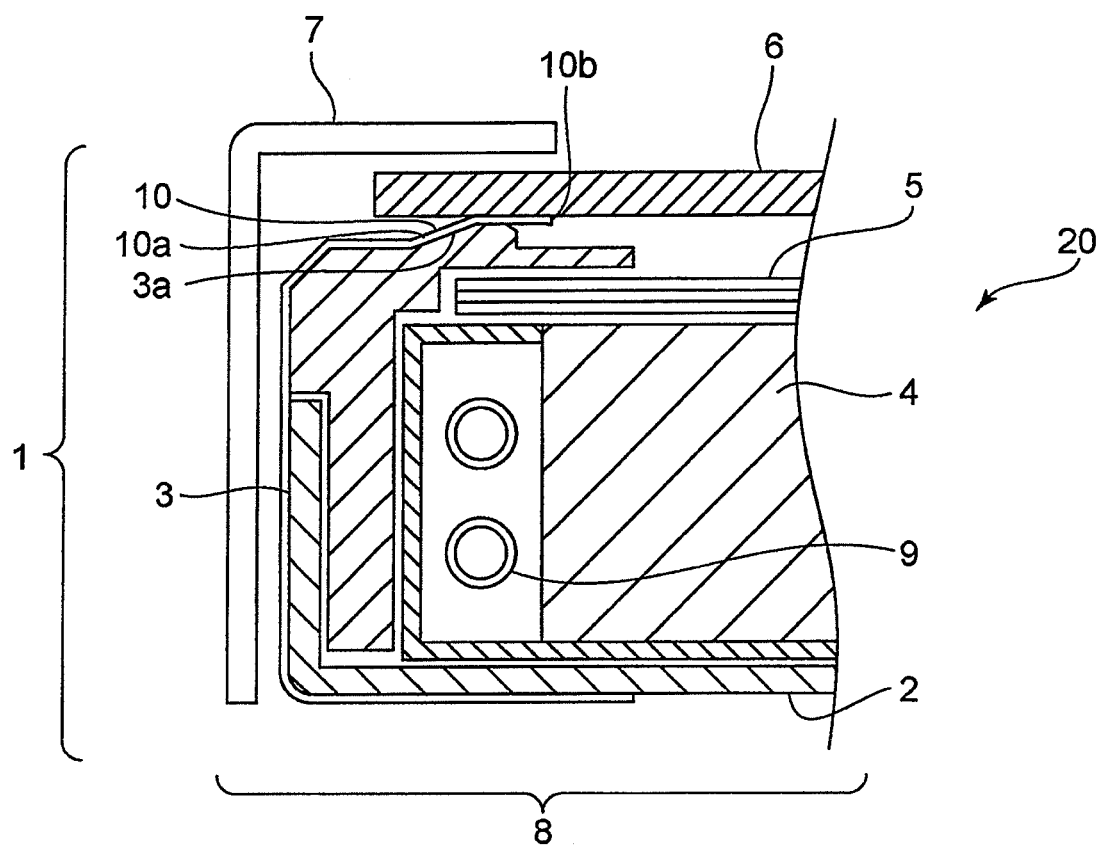
FIG. 23 is a partial cross-sectional view illustrating a configuration of a display device according to a third embodiment of this invention.

Referring to FIG. 23, a display device according to a third embodiment of this invention will be described.

FIG. 23 is an exploded cross-sectional view illustrating a liquid-crystal display device 1 according to the third embodiment of this invention. The liquid-crystal display device 1 shown in FIG. 23 has a backside member 20 including a backlight unit 8, a chassis 3 forming a front framework of the backlight unit 8, and a rear frame 2 forming a backside framework of the backlight unit 8. In this third embodiment, like in the first embodiment, the chassis 3 is provided with a slope portion 3a that is formed integrally. In the shown example, the third embodiment is different from the first and second embodiments in that the film member 10 is fixed to the chassis 3 having the slope portion 3a and to the rear frame 2.

Describing more specifically, the fixed portion 10a of the film member 10 shown in FIG. 23 is fixed to the slope portion 3a of the chassis 3, while the end 10b of the film member 10 situated at a position spaced from the fixed portion 10a extends toward the display panel 6 beyond the slope portion 3a.

According to this configuration, like the configuration of the first embodiment, the end 10b of the film member 10 is in contact with the display panel 6 in the state in which the display panel 6 and the front frame 7 are assembled with the backlight unit 8, and thus the space between the backlight unit 8 and the display panel 6 can be filled with the film member 10.

The film member 10 usable in this third embodiment is made of a thin film material, represented by a graphite sheet, having a thickness of 10 µm to 200 µm. The film member 10, having flexibility and higher thermal conductivity than the chassis 3, is able to efficiently conduct heat from the display panel 6 to the rear frame 2 made of a metal while constantly maintaining the followability to the behavior of the display panel 6 under vibration or temperature variation.

When the film member 10 is made of a flexible thin film material having electrical conductivity and a thickness of 10 µm to 200 µm, the film member 10 is able to efficiently conduct electrical charge charged to the display panel 6 up to the rear frame 2 made of a metal, while constantly maintaining the followability to the behavior of the display panel 6 under vibration or temperature variation.

The configuration of the third embodiment of this invention provides, in addition to those advantageous effects of the first embodiment, advantages that heat generated by the display panel 6 can be efficiently conducted to the rear frame 2 through the film member 10 having a high thermal conductivity, whereby the temperature of the display panel 6 is reduced and deterioration in display quality of the display panel 6 can be prevented.

Further, the electrically conductive film member 10 makes it possible to efficiently conduct the electrical charge charged to the display panel 6 to the rear frame 2, whereby the black display quality can be stabilized particularly in in-plane-switching (IPS) liquid-crystal panels.

Although the liquid-crystal display device has been described as an example of the display device in the description of the embodiments above, this invention is not limited to the liquid-crystal display device in any way. The invention is applicable to other types of FPD devices, such as organic EL display devices. An organic EL display device can be formed using a backside member 20 having a chassis 3 but not having a backlight unit 8 while using the chassis 3 having a slope portion 3a.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A display device comprising:
   a display panel; and
   a backside member arranged on the back side of a display face of the display panel, the backside member having, on the side facing the display face:
   a chassis having a slope portion which is nonparallel to the display face of the display panel; and
   a film member disposed between the display panel and the chassis,
   the film member having:
   a fixed portion fixed at least partially to the slope portion of the chassis; and
   an end provided at a position spaced from the fixed portion and being in contact with the display panel.

2. The display device as claimed in claim 1, wherein the chassis further comprises, on the surface facing the display panel, a step portion provided at a position adjacent to the slope portion, and the fixed portion of the film member extends along the step portion to the slope portion and is fixed to the slope portion.

3. The display device as claimed in claim 1, wherein the slope portion is provided on at least one side of the chassis so as to face the display panel, and the film member has the fixed portion arranged on the slope portion, and the end in contact with the display panel.

4. The display device as claimed in claim 3, wherein the slope portion includes a plurality of slope subportions provided so as to divide one side of the chassis, and the film member is in contact with the slope subportions and the display panel.

5. The display device as claimed in claim 1, wherein the display panel is a liquid crystal display panel, the backside member includes a backlight unit for illuminating the liquid crystal display panel, and the chassis forms a front framework of the backlight unit.

6. The display device as claimed in claim 1, wherein the backside member further comprises, on the side facing the display face, a backlight unit which illuminates the display face of the display panel and a rear frame forming a backside framework of the backlight unit, and the film member is arranged between the display panel and the backlight unit, and the fixed portion is fixed at least partially to the rear frame and the slope portion of the chassis so as to face an arbitrary position on at least one side of the display panel.

7. The display device as claimed in claim 1, wherein the slope portion is formed in plurality in the chassis.

8. The display device as claimed in claim 1, wherein the film member has flexibility.

9. The display device as claimed in claim 1, wherein the film member has a thickness of 10 μm to 200 μm.

10. The display device as claimed in claim 1, wherein the film member has a higher thermal conductivity than a material of the chassis to which the film member is fixed.

11. The display device as claimed in claim 1, wherein the film member has electrical conductivity.

12. The display device as claimed in claim 1, wherein the film members are arranged around the periphery of the display panel with their ends overlapped with each other.

13. The display device as claimed in claim 1, wherein the film members are arranged around the periphery of the display panel, and a notch is formed at each end of the film members.

14. The display device as claimed in claim 1, wherein the slope portion is formed by a plurality of projections.

15. The display device as claimed in claim 1, wherein the slope portion is of a shape having at least one curvature radius.

* * * * *